(No Model.)
O. A. COMSTOCK.
HEADLIGHT.
No. 573,177. Patented Dec. 15, 1896.
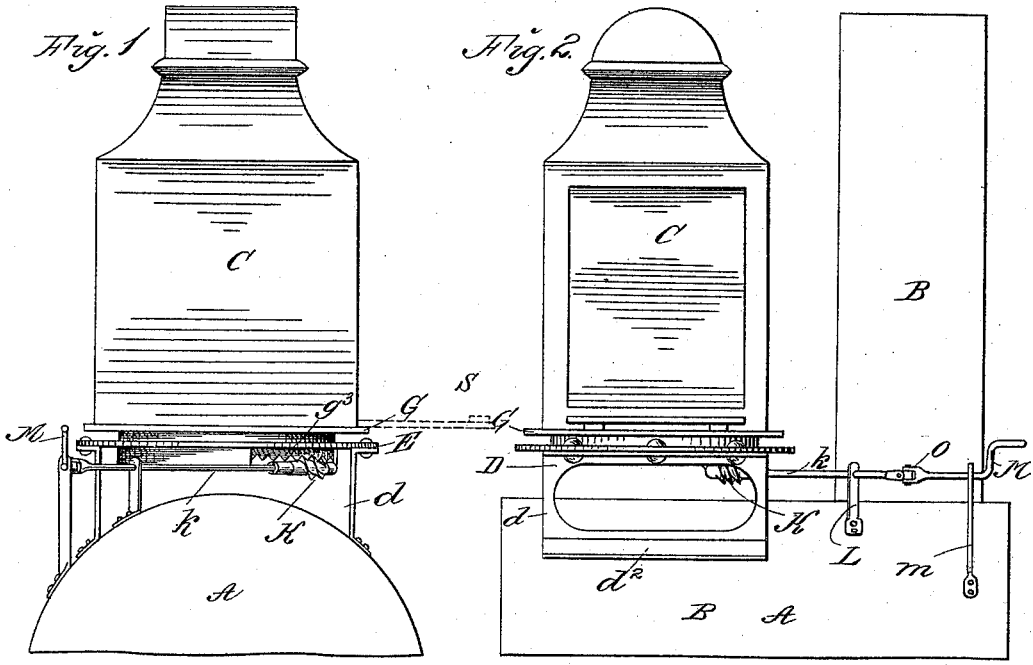
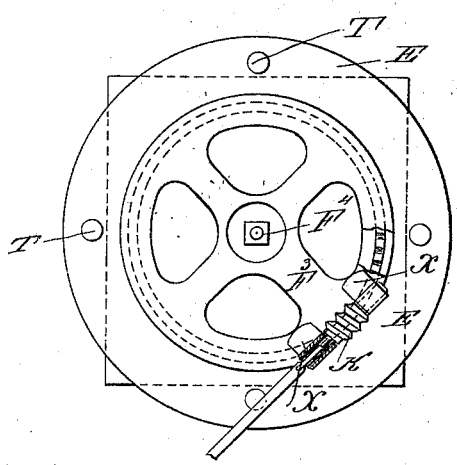
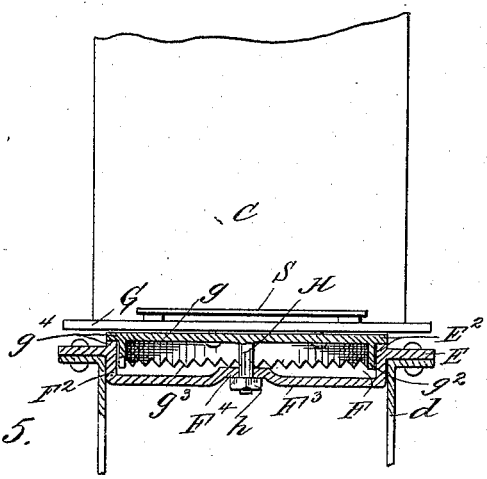
WITNESSES
E. Nordfors
C. Gerst
INVENTOR
Oscar A. Comstock
BY
Edgar Tate & Co.
ATTORNEYS
THE NORRIS PETERS CO., PHOTO-LITHO., WASHINGTON, D. C.

UNITED STATES PATENT OFFICE.

OSCAR A. COMSTOCK, OF AMBOY, ILLINOIS.

HEADLIGHT.

SPECIFICATION forming part of Letters Patent No. 573,177, dated December 15, 1896.

Application filed March 25, 1896. Serial No. 584,780. (No model.)

*To all whom it may concern:*

Be it known that I, OSCAR A. COMSTOCK, a citizen of the United States, and a resident of Amboy, in the county of Lee and State of Illinois, have invented certain new and useful Improvements in Headlights, of which the following is a specification, reference being had to the accompanying drawings, forming a part thereof, in which similar letters of reference indicate corresponding parts.

This invention relates to locomotive-headlights, and the object thereof is to provide means for turning the headlight of a locomotive laterally upon its supports, a further object being to provide an apparatus for this purpose which may be operated from the cab of a locomotive-engine; and with these and other objects in view the invention consists in the construction, combination, and arrangement of parts hereinafter described and claimed.

The invention is fully disclosed in the following specification, of which the accompanying drawings form a part, in which—

Figure 1 is a rear view of a section of a locomotive-boiler with the headlight mounted thereon; Fig. 2, a side view thereof, showing a section of the boiler and the smoke-stack and the headlight and also a side view of the means which I employ for turning the headlight; Fig. 3, a bottom plan view of the supporting-plate in which the headlight is mounted; Fig. 4, a sectional view showing the means by which the headlight is supported and also for turning the same, and Fig. 5 a sectional view of a worm-gear which I employ.

In the drawings forming part of this specification, A represents a part of a locomotive-boiler, B the smoke-stack, and C the headlight.

The headlight C may be of any desired form and construction; and the object of this invention is to provide improved means for turning or revolving the same laterally upon its support or supports, so as to throw the light from the reflector in any desired direction.

The headlight C is supported upon the boiler A by means of a frame D, the bottom portion of which comprises standards $d$, which are united by cross-bars $d^2$, and the upper portion of which consists of an annular plate E, which is provided with a central annular chamber F, formed by an annular rim or flange $F^2$, the lower side of which is provided with crossbars $F^3$, which are united by a central circular base or plate $F^4$, and the headlight is provided with a bottom or base plate G, to which is secured a circular plate $g$, which is provided with an annular depending flange or rim $g^2$, the lower side of which is provided with serrations or teeth $g^3$, and the flange or rim $g^2$ fits within the depending rim or flange $F^2$ of the plate E, and the annular plate E is provided at its inner edge with an upwardly-directed annular flange $E^2$, and the plate or annular ring $g$ is provided at its perimeter with a depending annular flange $g^4$, which fits over the annular flange $E^2$, so as to prevent water, snow, &c., from entering the chamber F. The worm-gear K is provided at each end with slots or openings $G^2$, so that the rod $k$ may be connected therewith from either side, and in the bottom of the headlight is a sliding frame S, which may be pulled out to form a support for the reflector when it is desired to clean the same, this sliding frame being shown in cross-section in Fig. 1, and the annular plate E is provided with apertures or openings T, through which attaching-bolts pass to secure the plate F to the supports D.

The headlight is also provided with a central pivot-pin H, which passes through the plate $g$ and through the central plate $F^4$ of the headlight-support, and said headlight is adapted to turn on the pivot-pin H, and mounted on said pin is a nut $h$, by which the headlight is held in position. I also provide a worm-gear K, which is suitably mounted at one side of the support of the headlight and which is adapted to operate in connection with the teeth $g^3$ on the annular rim or flange $g^2$, and said worm-gear K is provided with an operating-rod $k$, which extends diagonally across the top of the boiler and is supported by a standard L, and a crank-shaft M, which is adapted to be operated from the cab, is provided and connected with the operating-rod $k$ by a universal joint or coupling O.

The crank-shaft M is supported by a standard $m$, and it will be understood that any desired number of the standards L and $m$ may be provided, and the operation will be readily understood from the foregoing description when taken in connection with the accompanying drawings and the following statement: The crank-shaft M is adapted to be operated from the cab of the engine, as hereinbefore stated, and by turning said shaft, as will be readily understood, the headlight may be turned in either direction, either to the right or to the left, the movement of the crank-shaft determining the direction of the headlight.

This device is simple in construction and operation and well adapted to accomplish the result for which it is intended, and it is evident that changes in and modifications of the construction herein described may be made without departing from the spirit of my invention or sacrificing its advantages.

Having fully described my invention, I claim as new and desire to secure by Letters Patent—

The combination with a locomotive railway-engine, of the herein-described headlight revolubly mounted thereon, consisting of a casing provided with a base-plate G, to which is secured a circular plate $g$ having an annular depending rim $g^2$, the periphery of which is provided with serrations or teeth $g^3$, and having also an annular outwardly-directed rim or flange $g^4$, said plate $g$ being revolubly mounted in the annular plate E mounted on supports $d$ secured to the boiler of the engine, said plate E having an upwardly-directed rim $E^2$ upon which the flange $g^4$ of the plate G rests, said plate E having an annular depending flange $F^2$ provided with cross-bars $F^3$ united by a central circular base-plate $F^4$, to which the plate G is pivotally connected by means of a bolt and nut, keepers secured to the under side of the cross-bars $F^3$, and worm-gearing revolubly mounted in said keepers, adapted to engage the ratchet-teeth $g^3$ of the plate $g$, and a shaft K connected with said worm-gearing, and having connections with a crank-handle mounted adjacent to the cap, whereby the headlight may be turned in any direction, as herein set forth and described.

In testimony that I claim the foregoing as my invention I have signed my name, in presence of the subscribing witnesses, this 14th day of March, 1896.

OSCAR A. COMSTOCK.

Witnesses:
 JOHN FILER,
 WM. RANDALL.